Jan. 20, 1959     A. G. THOMAS     2,870,388
MOTOR CONTROL CIRCUIT Filed June 11, 1957                                                          4 Sheets-Sheet 1

*Fig.1*

Albert G. Thomas    INVENTOR.

Jan. 20, 1959  A. G. THOMAS  2,870,388
MOTOR CONTROL CIRCUIT

Filed June 11, 1957  4 Sheets-Sheet 2

Fig. 1a

Albert G. Thomas
INVENTOR.

Jan. 20, 1959 — A. G. THOMAS — 2,870,388
MOTOR CONTROL CIRCUIT
Filed June 11, 1957 — 4 Sheets-Sheet 4

Albert G. Thomas INVENTOR.

United States Patent Office 2,870,388
Patented Jan. 20, 1959

2,870,388

MOTOR CONTROL CIRCUIT

Albert G. Thomas, Butler, Pa., assignor to Industrial Controls Corporation, Chattanooga, Tenn., a corporation of Tennessee Application June 11, 1957, Serial No. 665,066

20 Claims. (Cl. 318—138)

This invention relates to electrical circuits and especially to electrical or electronic circuits for sensing the phasing of plural phase step motors. This is a continuation-in-part of the disclosure made in my patent application Serial No. 452,949, now Patent No. 2,806,987, filed August 30, 1954.

In using my step motors, as described in the above patent and patent application, it is necessary to employ a brake or lock to prevent rotor backswing or hunting. The control of the brake is relatively simple in cases where the motor speed is controlled by a counting circuit or the equivalent since one channel of a tape or other record can be employed for motor speed and another channel can be used to cause actuation of the brake at desired times. In an alternative method a separate channel of the tape or other record is employed for each phase of the motor and there is no tape channel for brake operation. In this case the brake actuation must be automatically determined by the direction of rotation of the motor or by the order of energizing the phases thereof. The present invention is concerned with phasing circuits for automatically setting the brake according to the order of energizing the motor phases, whether a two phase, three phase, or other step motor is involved.

It is an object to provide phase-sensing circuits for determining the order of energization of a plurality of circuits.

Another object is to provide means for determining the order of energization of the phases of a plural phase step motor.

A further object is to provide means for determining the order of energization of the phases of a plural phase step motor and for automatically setting the brake of the motor in accordance with the sensings.

An additional object is to provide phase sensing circuits of high speed and reliability for use with step motors or other devices.

Another object is to provide for a step motor system, circuits for sensing the direction of rotation of the motor and to cause reverse operation of an associated brake before actual reversal of rotation of the motor.

Another object is to provide a novel brake actuating device.

Other objects will be apparent in the following description.

Figure 1:
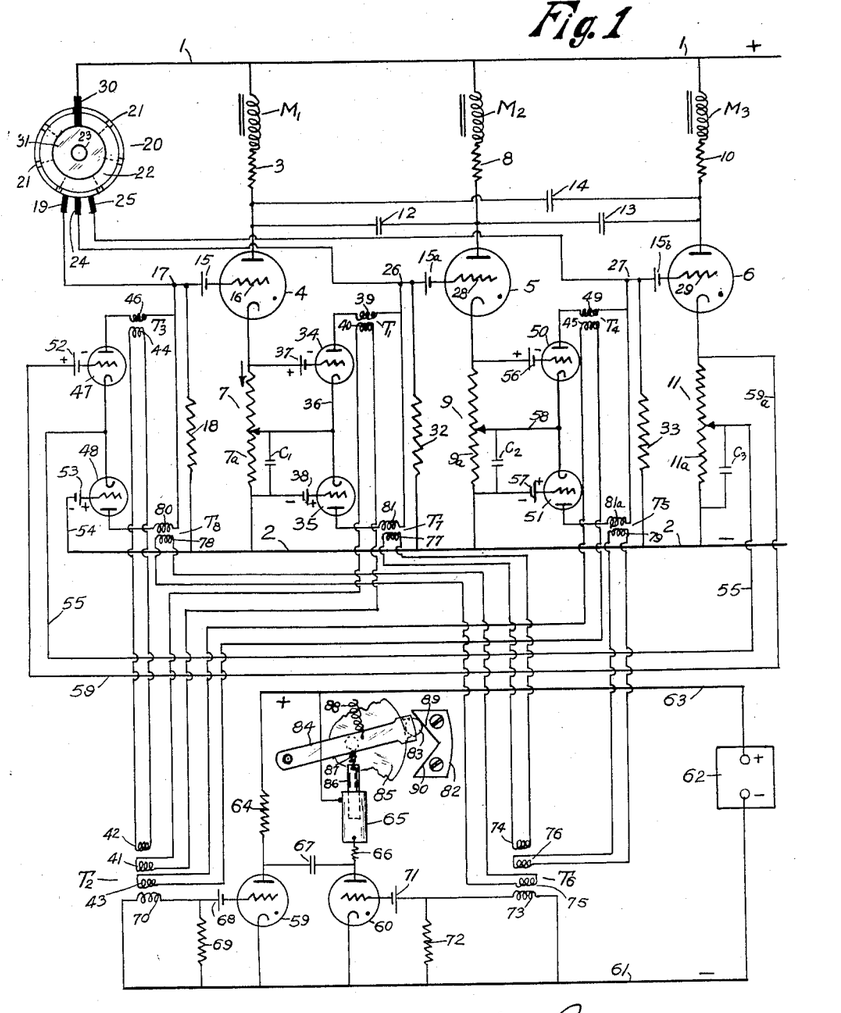
Figure 1 is a circuit diagram illustrating a phase-sensing circuit for a three-phase step motor having a reversible brake.

In Figure 1, the field windings of the three phase step motor are indicated by windings $M_1$, $M_2$, and $M_3$. This motor may be constructed as described in the above patent and preferably has the same number of stator and rotor poles, in each phase. The stator poles of the three sections or phases may be displaced relative to each other circumferentially by ⅓ tooth width, or the stator poles may be aligned and the rotor poles may be displaced by ⅓ circumferential tooth width, from phase to phase. A reversible brake is arranged to lock the rotor against rotation in one direction while allowing substantially free rotation in opposite direction and the effective direction of locking of the rotor may be reversed by a magnet, solenoid, or other device moving an arm or other member to reverse the brake. Various designs of brakes may be employed but a simple effective mechanism is a disc attached to the rotor shaft and cooperating with a roller or rollers which may be wedged between the disc and either surface of a double cam fastened to the motor. The roller may be shifted from one cam surface to the other by means of an arm or other member which may be moved by a solenoid or other electromagnetic device in one direction, a spring serving to move the arm in opposite direction. Of course, two solenoids or other electromagnetic devices may be used, one for each direction.

In the circuit, positive line 1 is connected to the positive terminal of a direct current generator or other source of direct current power and negative line 2 is connected with the negative terminal of this source of power. The motor windings $M_1$, $M_2$, and $M_3$ are connected between positive line 1 and negative line 2, in series with resistor 3, thyratron 4, and resistor 7; resistor 8, thyratron 5, and resistor 9; and resistor 10, thyratron 6, and resistor 11; respectively, as shown. Condenser 12 is connected between the anodes of thyratrons 4 and 5; conderser 13 is connected between the anodes of thyratrons 5 and 6; and condenser 14 is connected between the anodes of thyratrons 4 and 6. These condensers, in conjunction with resistors 3, 8, and 10, cause any conducting thyratron to be extinguished when any other of the three thyratrons is fired. The condensers should be of sufficient capacitance and elements 3, 8, and 10 should be of sufficient resistance to produce the extinguishing effect. The values can vary widely, depending upon the character of the motor windings, the size of thyratrons, the speed of operation, and other factors. I have used capacitance values from 1 mfd. to 40 mfd. and resistor values up to 50 ohms or more. The resistors have another beneficial effect since they, in a sense, reduce the inductive effect of the windings.

Battery or other potential source 15, which may be the filtered rectified output of a transformer and controlled by a potentiometer, has its negative terminal connected to the grid 16 of thyratron 4 and its positive terminal is connected to terminal 17 connected to one end of resistor 18, the other end of which is connected to negative line 2. Terminal 17 is also connected with brush 19 of commutator or distributor 20 which has a plurality of equally spaced metallic bars 21 imbedded in the periphery of insulating plastic disc 22 mounted on shaft 23 which is rotatable in suitable bearings, manually, or by mechanism of any suitable kind, such as a member of a machine, an instrument, or the like. Spaced brushes 24 and 25 are also in contact with the periphery of the distributor and are connected, respectively, with terminals 26 and 27 connected to the positive terminals of respective bias batteries 15a and 15b which are connected to the grids of thyratrons 5 and 6, as shown. Brush 30 is connected to positive line 1 or to another suitable source of current and this brush is in contact with slip ring 31 which is electrically connected with the bars 21 but is preferably insulated from shaft 23.

The spacing of bars 21 and the brushes 19, 24, and 25 is such that current from positive line 1 flows through resistors 18, 32, and 33, in that order when distributor 20 is rotated through equal angles in counter clockwise direction. Rotation of the distributor in opposite direction directs current through resistors 33, 32, and 18, in that order.

The cathodes of hard or evacuated tubes 34 and 35 are connected by conductor 36 which is connected to resistor 7 at a suitable point which may be the midpoint. Tube 34 is normally biased negatively to the point of cutoff by battery or other bias source 37 connected to the grid of tube 34 and to the cathode of tube 4. Tube 35 is similar to tube 34 and is normally biased positively by grid-connected battery or other source 38, the negative terminal of which is connected to the lower end of resistor 7 or to negative line 2. If desired, condenser $C_1$ may be connected across resistor portion 7a to shunt pulses around this resistor section. The values of the resistors will depend upon the tubes or transistors chosen and upon voltage and similar factors.

Primary winding 39 of transformer $T_1$ is connected between terminal 26 and the anode of tube 34 and the associated secondary winding 40 of this transformer is connected in series with primary winding 41 of transformer $T_2$ which has other primary windings 42 and 43 connected in series with secondary winding 44 of transformer $T_3$, and with secondary winding 45 of transformer $T_4$, respectively. Primary winding 46 is connected between terminal 17 and the anode of hard tube 47, the cathode of which is connected to the cathode of similar tube 48. Similarly the primary winding 49 of transformer $T_4$ is connected between terminal 27 and the anode of hard tube 50, the cathode of which is connected to the cathode of similar tube 51.

Tube 47 is normally biased negatively to the point of cut-off by bias source 52 connected between the grid of that tube and the cathode of thyratron 6 by conductor 59a, and tube 48 is normally biased positively by bias source 53 connected between the grid of that tube and negative line 2 by means of conductor 54. The cathodes of tubes 47 and 48 are connected to an intermediate point of resistor 11 by means of conductor 55. Similarly, tube 50 is normally biased negatively to the point of cut-off by bias source 56 connected between the grid of that tube and the cathode of thyratron 5, and tube 51 is normally biased positively to be conductive by bias source 57 connected between the grid of that tube and negative line 2. The cathodes of tubes 50 and 51 are connected to an intermediate point of resistor 9 by means of conductor 58. By-pass condenser $C_2$ and $C_3$ may be connected across the lower portions 9a and 11a of respective resistors 9 and 11, if desired.

Thyratrons 59 and 60 have their cathodes connected to negative line 61 which is connected to the negative terminal of direct current power source 62 which may be a generator, a battery, or a rectifier. The positive terminal of D. C. source 62 is connected through conductor 63 to the anode of thyratron 59 through resistor 64 and to the anode of thyratron 60 through solenoid 65 and resistor 66 in series. Condenser 67 is connected between the anodes of these thyratrons to cause either thyratron which may be conducting current to be extinguished when the other is fired.

The grid of thyratron 59 is connected to the negative terminal of battery or other bias source 68, the positive terminal of which is connected to one end of resistor 69. The other end of this resistor is connected to negative line 61. Secondary winding 70 of transformer $T_2$ is connected across the ends of resistor 69, as shown. Bias source 68 makes the grid of thyratron 59 sufficiently negative so that this tube normally is not conductive. Similarly, battery or other bias source 71, connected between the grid of thyratron 60 and negative line 61, through resistor 72, normally biases thyratron 60 negatively so that it does not conduct current. Secondary winding 73 of transformer $T_6$ is connected across the ends of resistor 72, through negative line 61, as indicated. Similarly to transformer $T_2$, the transformer $T_6$ has three primary windings 74, 75, and 76 connected in series, respectively, with secondary winding 77 of transformer $T_7$, secondary winding 78 of transformer $T_8$, and secondary winding 79 of transformer $T_5$. The primary winding 80 of transformer $T_8$ is connected between the anode of tube 48 and terminal 17; the primary winding 81 of transformer $T_7$ is connected between the anode of tube 35 and terminal 26; and the primary winding 81a of transformer $T_5$ is connected between the anode of tube 51 and terminal 27.

The tubes 47, 48, 34, 35, 50, and 51 may be identical and preferably should be of low inter-electrode capacitance, such as some tetrodes or pentodes, so that effective pulses will not be transmitted through negatively biased or non-conducting tubes. It will be noted that transformer primary windings 41, 42, and 43 are in mutually inductive relationship so that a pulse applied to one will also be applied to the others. If the tubes 47, 34, and 50 are biased sufficiently negatively, and are of relatively low capacitance this mutual inductance will cause no difficulty however since the induced pulses will be applied to the anode circuits; even if the direct or reflected pulses are applied in the proper direction to cause conduction. The same conditions are in effect with respect to primary windings 74, 75, and 76 of transformer $T_6$. Pulses induced from one of these windings to the other are applied to the anode circuits of tubes 48, 35, and 51 and either momentarily increase or decrease the anode current if the tubes are conducting or have no appreciable effect if the tubes are negatively biased to the point of cut-off. The values of various components can be chosen so that any change of current due to induced pulses will be negligible, or by-pass condensers can be connected across appropriate transformer windings; or diodes can be connected in the lines connecting the transformer primaries 41, 42, 43 with associated secondary windings 40, 44, and 45 in order to confine current conduction to one direction and so to reduce the effect described. Similarly, diodes or by-pass condensers can be used in connection with transformer primaries 74, 75, 76, and associated secondary windings.

Figure 1A:
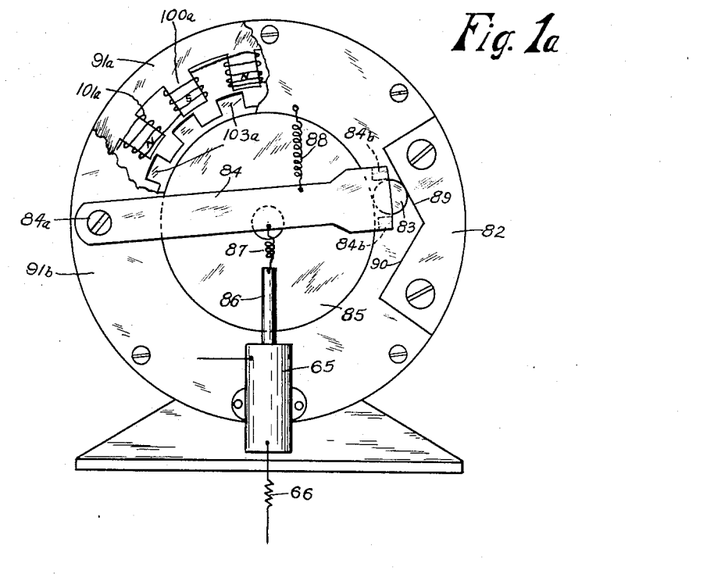
Figure 1a is an end elevation showing the motor and brake means of Figure 1.

As shown in Figure 1a, the motor has three spaced stator units 91a each with a plurality of stator teeth or poles 100a which may be equally spaced and the circumferential pole widths may be equal to the spaces between them. There are also three spaced rotor units having poles 103a of the same pole tip, widths as the stator poles and similarly spaced. The poles of the three phases of either the stator or rotor are relatively positionally phased so that if the rotor poles of one phase are in register with the associated stator poles of that phase the rotor poles of the next succeeding phase to be energized overlap the associated stator poles of that phase, preferably by ⅓ tooth width. Therefore the motor will always start and reversal of direction of rotation occurs if the connections of the first and third phase windings are interchanged. The stator teeth 100a are provided with windings 101a which are preferably placed around alternate teeth but every tooth can be wound. In order to provide a short magnetic paths the teeth may be of alternate North-South polarity as indicated. It is not necessary to wind the rotor teeth.

The arm 84 is pivoted to end bell 91b by means of bolt or screw 84a and this arm has integral lugs 84b extending from it to cage the roller 83 and to move this roller against a surface 89 or 90 of cam 82, according to the direction of rotation of the rotor and brake disc 85 fastened to the shaft of the rotor. It is necessary to use the brake to prevent oscillation or hunting of the rotor particularly for low speeds. If the brake is not used the rotor will oscillate about in-register positions of the rotor and stator teeth, for each phase, and the resulting motor operation is very erratic and unsatisfactory. The brake stops the rotor in its most advanced position for each step and holds it until energization of the next succeeding phase occurs thereby preventing backswing of the rotor.

The motor brake comprising double cam 82, roller 83, operating arm 84, and brake disc 85, shown in fragmentary manner in Figure 1, is illustrated. The armature 86 of the solenoid is connected to arm 84 by stiff spring 87 and tension spring 88, connected to the arm and to the motor frame, normally pulls the arm over so that roller 83 is wedged between cam surface 89 and disc 85 to prevent counter clockwise rotation thereof but allows substantially free rotation in opposite direction. If solenoid 65 is energized, the armature 86 will be pulled into the solenoid and arm 84 will be pulled in clockwise direction until caged roller 83 strikes cam surface 90 and locks disc 85 and the rotor against rotation in clockwise direction but allows substantially free rotation in opposite direction. Cam 82 and the pivot of arm 84 are attached to the motor frame or end bell. Disc 85 is fastened to the motor shaft. This brake is described in the above listed patents and in connection with Figure 1a. It is desirable that the cam be so arranged that roller 83 need be moved only a short distance in order to reverse the brake so that the brake can be set for either direction in a short time interval. For this purpose two rollers may be used, if desired, one for one cam surface and the other roller for the other cam surface.

The drawing shows current source 62 as being separate from the source connected with positive line 1 and negative line 2 but these sources could be combined into one source, negative line 61 being connected with negative line 2. If maximum isolation is desired, the connections shown may be used.

In operation, the cathodes of the tubes are supplied rated current through transformers or the like and it will be considered that firing the thyratrons 4, 5, and 6 in the order named causes forward rotation of the motor. These thyratrons are fired in that order when distributor 20 is rotated in counter clockwise direction since current from brush 30 is passed through slip ring 31 and connected bars 21 which strike brush 19 first, then brush 24 and then brush 25 so that current is distributed to resistors 18, 32, and 33 in that order causing firing of the thyratrons 4, 5, 6, in sequence. Current flow through these resistors produces positive bias of the thyratron grids sufficient to overcome the normal negative bias so that the thyratrons are fired sequentialy, any conducting thyratron being extinguished when another is fired. The negative bias will depend in value upon the type of tube used but I have found that using thyratrons of several amperes or more current-carrying capacity, a negative bias of 90 volts is frequently satisfactory. The positive firing pulses should preferably be of 100 volts or more potential.

When thyratron 4 is fired current will pass through resistor 7 in the direction of the arrow, making the grid of tube 34 positive so that this tube becomes conductive. At the same time the current will develop a negative bias of the grid of tube 35 sufficient to cut off the conductivity of this tube. Therefore when the next pulse is applied to terminal 26 and connected resistor 32 to cause firing of thyratron 5, part of the pulse of current will pass through primary winding 39, through tube 34 and through resistor 7 and portion 7a to negative line 2, or partly through by-pass condenser $C_1$ if it is used. Current passing through resistor portion 7a results in biasing tube 35 negatively to the point of cut-off. The pulse of current in transformer primary winding 39 will induce a pulse in secondary winding 40 which in turn causes a pulse of current in connected primary winding 41 of transformer $T_2$. The phasing is such that this winding induces a pulse in secondary winding 70 which applies a positive pulse to the grid of thyratron 59, of sufficient potential to fire this thyratron if it is not already fired, or to tend to keep it fired in case it is already conducting current. Tube 59 serves the purpose of causing extinction of thyratron 60 and so if tube 59 is fired the solenoid 65 is not energized.

When the current pulse is applied to resistor 32 thyratron 5 is fired and thyratron 4 is extinguished. Then current passes through resistor 9 causing tube 50 to become conductive and causing tube 51 to be biased negatively to the point of cut-off in similar manner as described for tubes 34 and 35. In the meantime, after current ceases to flow through thyratron 4 and resistor 7, tube 34 is again biased negatively to the point of cut-off and tube 35 becomes conductive again.

When the next pulse is applied to terminal 27 and connected resistor 33, thyratron 6 is fired and a pulse of current passing through primary winding 49 and tube 50 is applied to the grid of thyratron 59 as a positive firing pulse, through the agency of transformer windings 45, 43, and 70, in the same general manner as previously described. The same conditions prevail when the next pulse is applied to terminal 17 to cause firing of thyratron 4. The current passing through resistor 11 causes tube 47 to be conductive and tube 48 to be non-conductive so that a pulse will pass through transformer windings 46, 44, 42, and 70 to apply a positive firing pulse to thyratron 59. It will be seen therefore that nothing happens when the motor windings $M_1$, $M_2$, and $M_3$ are energized in that order to cause forward rotation, except that thyratron 59 is maintained in fired or current-conducting condition.

Now consider for convenience that thyratron 5 is fired and that it is desired to reverse the direction of rotation of the motor. In that event the next firing pulse from distributor 20 will be applied to terminal 17 to cause firing of thyratron 4 and this can be accomplished by reversing the direction of rotation of the distributor or by operating a reversing relay which interchanges the connections of terminals 17 and 27 with relation to the distributor. Since no current is flowing through tube 6 and resistor 11, the tube 47 will be negatively biased to the point of cut-off and tube 48 will be positively biased to be conductive. Therefore when the positive current pulse is applied to terminal 17, part of the current will pass through resistor 18 to cause thyratron 4 to fire and part of the current pulse will pass through primary winding 80, through tube 48, and conductor 55, and thence through resistor portion 11a to negative line 2. Part of the pulse will pass through by-pass condenser $C_3$ if used. The current pulse in primary winding 80 will induce a pulse in secondary winding 78 and connected primary winding 75 which in turn induces a pulse in secondary winding 73 which is phased to apply a positive pulse to the grid of thyratron 60, of sufficient potential to fire this thyratron. When that happens, thyratron 59 is extinguished and current from source 62 passes through solenoid 65, resistor 66, and thyratron 60 and negative line 61. This causes plunger 86 to be quickly pulled into the solenoid and arm 84 is pulled over so that roller 83 is pressed against cam surface 90 and disc 85, locking the disc and rotor against rotation in forward direction but allowing free rotation in reverse direction.

In similar manner one of the primary windings 74, 75, or 76 will be pulsed to cause firing of thyratron 60 and energization of the brake-reversing solenoid when the order of firing the thyratrons 4, 5, 6 is reversed, regardless of which thyratron happens to be fired. This is true since the three circuits are similar and are similarly connected. It is important that the brake be reversed before the rotor begins to swing back to be locked in position after a reversal. Ordinarily the motor inductance and inertia, being greater than the inductance and inertia of the solenoid and brake mechanism, will take care of this timing but, if desired, condensers may be shunted across resistors 18, 32, and 11, to reduce the speed of firing the motor thyratrons, or other time delay means may be employed.

The thyratron 60 will continue to be fired as long as the thyratrons 6, 5, 4 are fired in this reverse order. When, however, another reversal occurs and the thyratrons are fired in the order 4, 5, 6, causing forward rotation of the motor, thyratron 59 will be quickly fired to extinguish thyratron 60 and so to deenergize solenoid 65, allowing spring 88 to pull arm 84 quickly over so that roller 83 is in contact with cam surface 89, for forward rotation of the motor. If desired, a solenoid could be used to pull arm 84 in one direction and another solenoid can be employed to pull the arm in opposite direction. While a commutator or distributor is shown it is apparent that the same or an equivalent direction-sensing circuit may be used to set the brake quickly upon reversal of the motor when a tape, cards, or other record is employed as the controlling medium. The pulse transformers used should be fast-acting and may be air core types or may have powdered iron or similar cores. The transformers $T_2$ and $T_6$ are shown as having three primary windings and one secondary winding each but three separate transformers may be used in each case, if preferred.

Figure 2:
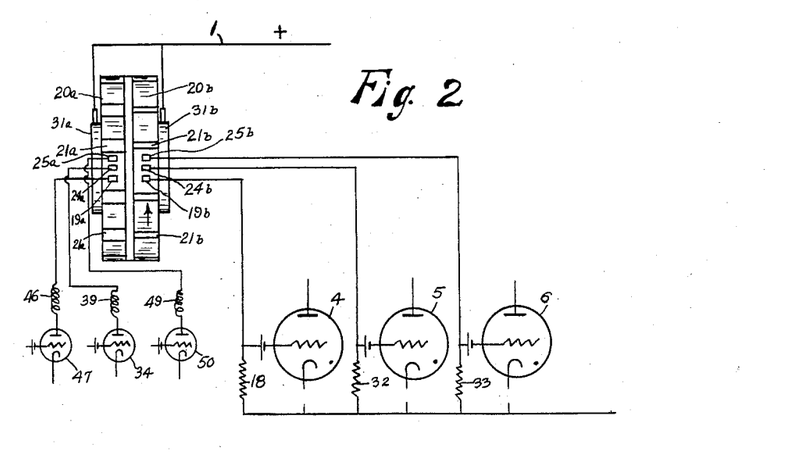
Figure 2 illustrates a double distributor or commutator phased to cause energization of the brake circuit before reverse energization of the power tubes or other current control devices.

One method of insuring that the small tubes, and consequently thyratron 59 or thyratron 60 will be fired before firing the relevant thyratron 4, 5, or 6, is illustrated in fragmentary Figure 2. In this modification like parts are given similar numerals as before and the distributor is divided into two parts 20a and 20b mounted on a common shaft for rotation together and having respective slip rings 31a and 31b connected with respective commutator bars 21a and 21b. The resistors 18, 32, and 33 are connected to respective brushes 19b, 24b, and 25b and the transformers 46, 39, and 49 are connected to brushes 19a, 24a, and 25a, respectively, as indicated. The edges of bars 21a may be arranged to strike the associated brushes 19a, 24a, 25a, slightly before the edges of bars 21b strike brushes 19b, 24b, 25b, for either direction of rotation of the distributor, so that thyratrons 59 or 60 will be fired before thyratron 4, 5, or 6 is fired. This is accomplished by making the circumferential width of bars 21a greater than the similar width of bars 21b and placing the bars so that the edges of bars 21a will strike their associated brushes before the edges of bars 21b strike their related brushes. The time delay of firing thyratrons 4, 5, 6 can then be predetermined, with respect to the firing of thyratrons 59 or 60. The relative overlap of the two sets of bars may be made adjustable if desired.

Figure 3:
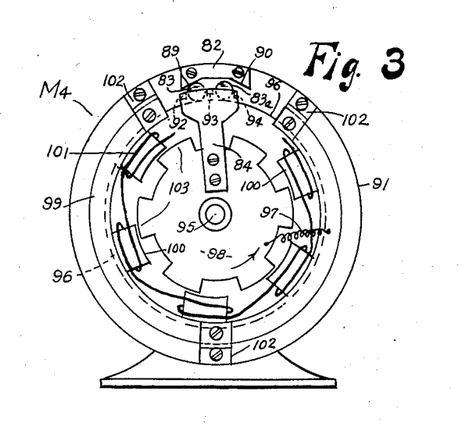
Figure 3 shows an end elevation of a brake-controlled motor and rotor type electromagnetic means for actuating the brake.

Figure 3 shows a rotary type solenoid or the like attached to an end bell of a step motor for shifting the brake to forward or reverse positions. Motor has a plurality of phases or sections with circumferentially equally spaced stator teeth and associated rotor teeth, in each phase, and the stator and rotor teeth for one phase are relatively positionally phased with relation to another phase. Then if the stator phase windings are energized in sequence, step rotation of the motor results, the direction of rotation depending upon the order of energization of the stator phases, considering a three phase motor, for instance. In order to prevent oscillation or backswing of the rotor it is necessary to lock it against rotation in one direction while allowing substantially free rotation in opposite direction and this is the function of the brake.

In many cases it is desired that the brake be reversible in effective direction. In prior motors I have used standard solenoids to shift the brake roller-carrying arm but these solenoids are usually bulky and not adapted to fit into available space of the motor. For this reason I have designed the rotary solenoid or motor construction illustrated.

Motor $M_4$ is a step motor which may be made as described in one of the previously mentioned patents. Cam 82, with hardened surfaces 89 and 90, is screwed or otherwise fastened to end bell 91 of the motor. Rollers 83 and 83a are caged between lugs 92 and 93 and between lugs 93 and 94, extending from arm 84 which is screwed or otherwise fastened to rotor 98 which is rockable around shaft 95 or another bearing. Peripherally hardened disc 96 is keyed to shaft 95 and rotates with it. Tension spring 97 is attached to rotor 98 and to end bell 91 and normally holds the arm in the position shown with roller 83 in contact with cam surface 89 and disc 96 so that this roller will be wedged between the cam surface and the disc to lock the disc and rotor against rotation in counter clockwise direction while allowing substantially free rotation of the disc and rotor in clockwise direction. The brake is shown set for forward or clockwise rotation of the motor and roller 83a is spaced only a short distance from cam surface 90 so that reverse setting of the brake can be accomplished with a very small clockwise rotation of arm 84.

Stator ring 99 is made of good magnetic material and may be laminated. Poles 100 project inwardly from the ring and are surrounded by windings 101 which produce strong magnetization of the poles when alternating or direct current passes through the windings. These windings may be connected in series or in any other suitable manner. Stator ring 99 is supported outside of brake wheel or disc 96 by means of brackets 102 fastened to the end bell 91 and to ring 99 by means of screws. These brackets have feet as indicated and have intermediate portions supporting the stator sufficiently far out to give clearance for the brake disc.

Rotor 98 has extended poles 103 circularly curved to provide relatively close air gaps between the rotor poles and similarly curved stator poles 100. The rotor may likewise be laminated, if desired, and is made of material which will become strongly magnetized when the stator poles are magnetized. As shown, the stator poles overlap the rotor poles so that clockwise torque will be developed in the rotor to move arm 84 clockwise to force roller 83a against cam surface 90 when stator windings 101 are energized. When the field windings 101 are deenergized, spring 97 pulls arm 84 back to the position shown, with roller 83 in contact with cam surface 89, for forward or clockwise rotation of the motor. The brake in this condition prevents any appreciable rotation of the disc and rotor in counterclockwise direction, and when roller 83a is in contact with cam surface 90, free rotation of the disc and rotor in counterclockwise direction can occur but any appreciable rotation in opposite direction is prevented by the locking action of roller 83a in conjunction with disc 96 and cam surface 90. This brake design is desirable since only a small movement of arm 84 is necessary and the strong rotary type solenoid or the like can be put in a narrow space without unduly increasing the overall length of the motor.

Figure 6:
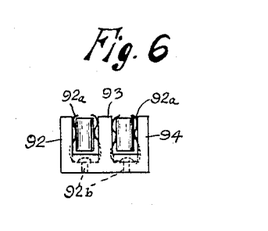
Figure 6 is a top plan view of a roller actuating arm with spring mounted rollers.

In order to balance the braking action on the disc, arm 84 may be extended and another pair of rollers may be used in conjunction with another similar cam situated diametrically opposite to cam 82. In that case it is desirable to provide the rollers with strip type springs 92a, as shown in Figure 6, and fastened to the cage by screws 92b. The springs insure that both sets of diametrically opposite rollers, one pair for forward rotation and the other pair for reverse rotation, will be in contact with the cam surfaces simultaneously.

Figure 4:
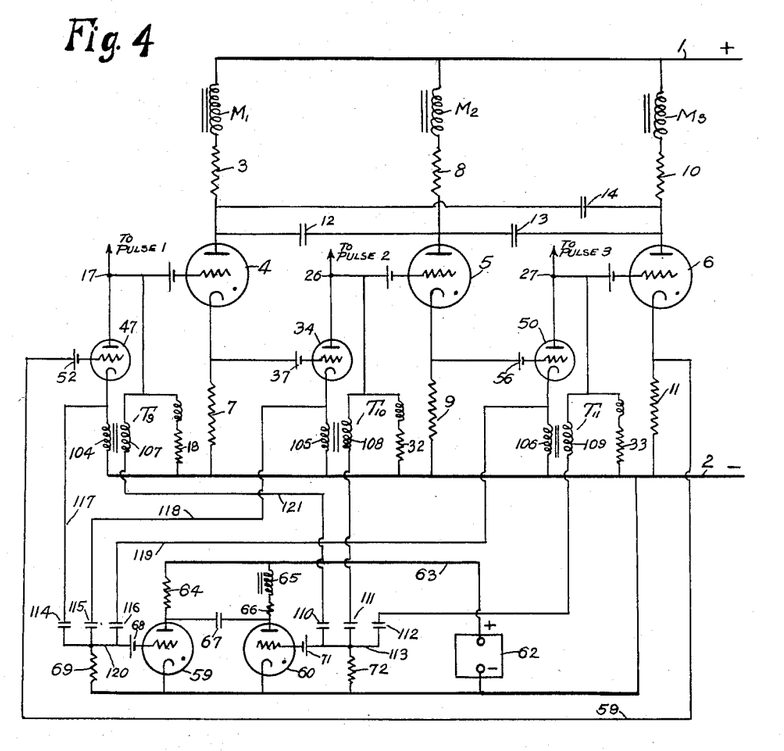
Figure 4 illustrates a modified circuit for sensing the direction of rotation of the motor or the order of energization of the current control devices associated with the motor phases, and including means for causing operation of the brake.

In Figure 4 and following circuit diagrams like parts are designated by like numerals as used in connection with Figure 1. In the modification shown in Figure 4, the hard tubes 47, 34, and 50 are connected to respective terminals 17, 26, and 27 without intervening transformers as before. The primary windings 104, 105, 106 of respective transformers $T_9$, $T_{10}$, and $T_{11}$ are connected between the cathodes of tubes 47, 34, 50, and negative line 2, as shown. The secondary windings 107, 108, and 109 are connected between the associated terminals 17, 26, 27 and terminals of condensers 110, 111, and 112, the other terminals of which are connected to conductor 113 which is connected to resistor 72 and the positive terminal of battery or other bias source 71 which normally biases the grid of thyratron 60 sufficiently negatively to prevent conduction through the thyratron.

The cathodes of tubes 47, 34, and 50 are connected to terminals of condensers 114, 115, 116 by respective conductors 117, 118, and 119 and the other terminals of these condensers are connected to conductor 120 which is connected to resistor 69 and to the positive terminal of battery or other bias source 68 which normally keeps the grid of thyratron 59 sufficiently negative to prevent that tube from firing. Suitable high resistance leaks could be used across the condensers 110 to 112 and 114 to 116, if desired.

The transformers $T_9$, $T_{10}$, and $T_{11}$ preferably have step-up turns ratios so that potentials applied to the primary windings will produce greater potentials in the secondary windings and these transformers should be capable of relatively fast pulse rates.

In operation, if the pulses from commutator 20 or from a tape or other record-controlled device are applied to terminals 17, 26, and 27 in that order, corresponding to forward rotation of the motor, then each tube 47, 34, or 50 ahead of the following pulse will be made conductive due to current flow through the associated resistor 7, 9, or 11. Therefore, taking terminal 26 as an example, the next pulse applied to this terminal, considering that thyratron 4 is fired, will pass through tube 34 and primary winding 105 to negative line 2. The positive potential taken off of winding 105 by conductor 118 will be passed through condenser 115 and resistor 69 to cause thyratron 59 to fire if it is not already fired. The negative line 61 is in this case connected to negative line 2. The rising current in primary winding 105 will induce an oppositely polarized potential in secondary winding 108 so that a bucking action is provided to prevent the pulse from terminal 26 from effectively passing through condenser 111. Thyratron 60 will therefore not be fired under these conditions.

Similar conditions prevail for the other pulse terminals 17 and 27. If thyratron 6 is fired, then tube 47 will be conductive and a pulse applied to terminal 17 will be bucked in winding 107 but will develop a potential across winding 104, transmitting a positive pulse to the grid of thyratron 59 through condenser 114 and resistor 69, firing this thyratron should it not be fired. Similarly, if thyratron 5 is fired a pulse applied to terminal 27 will also produce a positive pulse through condenser 116 and resistor 69. Now in case tube 5 is fired and a positive pulse is applied to terminal 17 to produce reverse rotation of the motor, then tube 47 will be non-conductive and so a potential will not be developed across winding 104 and there will be no bucking potential in winding 107. Therefore a positive pulse will be carried to condenser 110 by conductor 121 and a positive potential will be momentarily produced across resistor 72 to cause thyratron 60 to fire, thereby extinguishing thyratron 59 through the agency of condenser 67. When thyratron 60 is fired, solenoid 65 is energized as described before and the brake is rapidly reversed.

It is evident that as long as the thyratrons 4, 5, and 6 are fired in that order, for forward rotation, thyratron 59 will be maintained in fired condition due to positive pulses passed through condensers 114, 115, and 116 and thyratron 60 will be extinguished. Therefore the brake solenoid 65 will not be energized and the brake will be set for forward operation. When, however, the order of energization of thyratrons 4, 5, and 6 is reversed, to cause reverse rotation of the motor, positive pulses are passed through condensers 110, 111, and 112 to fire thyratron 60 and so to energize brake solenoid 65, thereby setting the brake for reverse rotation of the motor. A relay controlling the brake solenoid can be used in circuit with tube 60 if desired.

Figure 5:
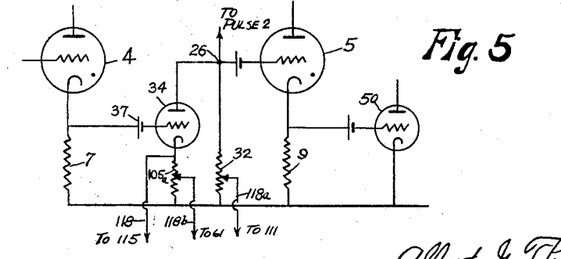
Figure 5 is a fragmentary circuit diagram illustrating a bridge type phase sensing circuit.

Many variations of the circuit can easily be made without departing from the broad principles which I have disclosed. For instance, as shown in fragmentary circuit diagram, Figure 5, bridge circuits may be employed in association with each of the thyratrons 4, 5, and 6, in the same manner as illustrated for thyratron 5. The connections are shown, the resistor 105a being connected in series with hard tube 34 which is otherwise connected as in Figure 4. Transformers $T_9$, $T_{10}$, and $T_{11}$ of the prior Figure are not used. The conductor 118a leading to condenser 111 is connected to resistor 32 at a point so that when tube 34 is made conductive the potential developed in conductor 118b connected to resistor 105a and the potential developed in conductor 118a, due to a pulse being applied to terminal 26, will be equal. Therefore, under these conditions, a positive pulse will be developed in conductor 118 to fire thyratron 59 but no net pulse will be developed in conductor 118a and thyratron 60 will not be fired. As before, if thyratron 4 had not been fired tube 34 would not pass current and a pulse would not be developed in conductor 118 and a net positive pulse will be developed in line 118a to fire thyratron 60 when the pulse is applied to terminal 26. As previously described, suitable time delay means can be used to delay the firing of tubes 4, 5, 6 until one or the other of thyratrons 59 or 60 is fired.

Many other variations of the general principle involved may easily be arranged. Likewise, hard tubes, transistors, magnetic current control devices, or the equivalent, can be used in place of the thyratrons shown in the described circuits.

What I claim is:

1. In a motor control system, a motor having brake means settable for forward or reverse rotation of said motor, means including electromagnetic means for setting said brake means for said forward or reverse rotation, a plurality of current control devices for supplying current to said motor, means for energizing said devices in predetermined order to produce forward rotation of said motor, means for effecting a change of the order of energization of said devices to produce reverse rotation of said motor, electrical circuit means for sensing said change of order, and means associating said sensing circuit means with said electromagnetic means to cause setting of said brake means for reverse rotation of said motor when said change of the order of energization of said current control devices occurs.

2. In a motor control system, a motor having brake means settable for forward or reverse rotation of said motor, means including electromagnetic means for setting said brake means for said forward or reverse rotation, a plurality of current control devices for supplying current to said motor, means for causing said devices to conduct current in predetermined order to produce rotation of said motor in one direction, means for effecting a change of the order of current conduction by said devices to produce rotation of said motor in a direction opposite to said one direction, electrical circuit means for sensing said change of order of current conduction by said devices, and means associating said sensing means with said electromagnetic means to cause a change of setting of said brake means in predetermined relationshp with said change of order of current conduction by said devices.

3. The system as described in claim 2, said sensing means acting to cause change of setting of said brake means before change of direction of rotation of said motor occurs.

4. The system as described in claim 2, said sensing means acting to cause change of energization of said electromagnetic means before associated change of order of current conduction by said current control devices occurs.

5. The system as described in claim 2, said current control devices comprising gaseous tubes.

6. In a motor control system, a motor having a plurality of phases, brake means settable for rotation of said motor in one direction and settable for rotation thereof in opposite direction, a plurality of current control devices for supplying current to said motor phases, control means for causing said current control devices to conduct current to said phases in predetermined order to produce rotation of said motor in said one direction, said control means being adapted also to cause a change of the order of current conduction of said devices to said phases to produce said rotation of said motor in a direction opposite to said one direction, electromagnetic means for setting said brake means, current control means for supplying current to said electromagnetic means, and circuit means associated with said control means and said current control devices for affecting said current control means to cause said electromagnetic means to change the setting of said brake means in accordance with change of the order of current conduction by said current control devices.

7. The system as described in claim 6, said current control means being affected by said control means to cause said electromagnetic means to change the setting of said brake means before the associated change of order of current conduction by said devices produces change of direction of rotation of said motor.

8. The system as described in claim 6, said motor being a step motor.

9. In a system for controlling a step motor having a plurality of phases, brake means settable for preventing rotation of said motor of more than a partial step in one direction and settable for preventing rotation thereof of more than a partial step in a direction opposite to said one direction, electromagnetic means for setting said brake means, a plurality of current control devices for controlling current supplied to said phases, means including distributor means for supplying control electrical pulses in predetermined order to said devices to cause said motor to rotate in said one direction, said distributor means being also adapted to change the order of supplying said electrical pulses to said devices to cause rotation of said motor in a direction the reverse of said one direction, current control means for supplying current to said electromagnetic means, and circuit means associating said distributor means and current control devices with said current control means to cause said electromagnetic means to change the setting of said brake means upon change of the order of supplying said electrical pulses to said current control devices.

10. In a motor control system, a step motor having a plurality of phases, brake means permitting rotation of said motor in one direction and restricting rotation thereof in opposite direction to partial step movements, electromagnetic means for setting said brake means to reverse the effective direction of braking thereof, means for supplying current sequentially to said phases in predetermined order to produce step rotation of said motor in said one direction, said current supplying means being also adapted to supply current to said phases sequentially in an order opposite to said predetermined order to produce step rotation of said motor in said opposite direction, and circuit means electrically made effective by said current supplying means to cause actuation of said electromagnetic means to reverse the setting of said brake means upon reversal of the order of supplying current to said phases.

11. In a motor control system, a step motor having a plurality of phases, brake means permitting rotation of said motor in one direction and restricting rotation thereof in opposite direction to partial step movements, electromagnetic means for setting said brake means to reverse the effective direction of braking thereof, a plurality of gaseous grid-controlled electronic tubes for supplying current sequentially to said phases to produce rotation of said motor, means for biasing the grids of said tubes negatively to prevent current conduction therethrough, means for supplying positive pulses to the grids of said tubes in predetermined order to cause firing of said tubes sequentially to cause rotation of said motor in said one direction, means for causing extinction of a conducting tube when another tube is fired, said means for supplying pulses also being adapted to supply positive pulses to the grids of said tubes to cause firing thereof in a reverse order to said predetermined order to cause rotation of said motor in said opposite direction, a plurality of grid-controlled electronic tubes associated with said gaseous tubes and adapted to be controlled by current flow therethrough, a pair of grid-controlled gaseous tubes comprising a first tube and a second tube, said electromagnetic means being electrically associated with said second tube and controlled thereby, means for causing extinction of either of said pair of tubes when the other is fired, and circuit means associating said pair of tubes with the other said gaseous tubes and said electronic tubes to cause positive firing pulses to be supplied to the grid of said first gaseous tube when said pulse supplying means causes firing of said plurality of gaseous tubes in one order and for causing positive firing pulses to be supplied to the grid of said second gaseous tube when said pulse supplying means reverses said one order of supplying pulses to cause firing of said plurality of gaseous tubes.

12. The system as described in claim 11, and including means for supplying current to said tubes.

13. The system as described in claim 9, said distributor means including a plurality of commutators, and a plurality of brushes relatively phased with respect to conductive elements of said commutators.

14. The system as described in claim 11, said means for supplying positive pulses including a commutator and brush means associated therewith for supplying pulses to the grids of said plurality of gaseous tubes and including another commutator and brush means associated therewith and phased for supplying pulses to the grids of said pair of gaseous tubes before pulses are supplied to the grids of said plurality of gaseous tubes.

15. In a step motor system, a step motor having a plurality of phases, means for supplying current to said phases in predetermined order to cause rotation of said motor in one direction, said means also being adapted to supply current to said phases in opposite order to cause rotation of said motor in a direction the reverse of said one direction, brake means for permitting rotation of said motor in said one direction but preventing rotation thereof of more than a partial step in said reverse direction, means including electromagnetic means for setting said brake means to permit rotation of said motor in said opposite direction and to prevent rotation thereof of more than a partial step in said one direction; said electromagnetic means comprising a rotor having a plurality of poles and an associated stator having a plurality of poles, and winding means for causing magnetization of said stator and rotor poles.

16. In a motor control system, a motor having brake means settable for forward or reverse rotation of said motor, means including electromagnetic means for setting said brake means for forward or reverse rotation, a plurality of current control devices for supplying current to said motor, means for energizing said devices in predetermined order to produce rotation of said motor in predetermined direction, electrical circuit means electrically connected with said energizing means for sensing the order of initiating the energization thereof before rotation of said motor in reversed direction occurs, and means associating said sensing means with said electromagnetic means to cause setting of said brake means for reversed rotation before a full step of reversed rotation occurs.

17. In a motor control system, a motor having a plurality of phases, a plurality of current control devices for supplying current to said phases, means including distributor means for supplying control currents to said current control devices in predetermined order to cause rotation of said motor in forward or reverse direction, reversible brake means for preventing appreciable rotation of said motor in a direction the reverse of that as determined by the order of energization of said current control devices, electromagnetic means for causing reversal of the setting of said brake means, electrical means electrically connected with said distributor means for sensing the order of applying control currents to said current control devices, and electrical means associating said electrical sensing means with said electromagnetic means for causing operation thereof before any appreciable reversed rotation of said motor occurs.

18. The motor control system as described in claim 17, said motor comprising a step motor, and said brake confining rotation of the motor to a fraction of a step in a direction the reverse of the direction of rotation as determined by the order of energization of said current control devices.

19. In a step motor control system, a step motor having a plurality of phases, a plurality of principal current control devices for supplying current to said phases, means including distributor means for supplying control currents to said principal current control devices in predetermined order to cause rotation of said motor in forward or reverse direction, reversible brake means for preventing rotation of said motor of more than a partial step in a direction the reverse of the direction of rotation as determined by the order of energization of said principal current control devices, electromagnetic means for causing reversal of the setting of said brake means, means including a plurality of auxiliary current control devices electrically connected with said distributor means and adapted to control currents therefrom, electrical means connecting said principal current control devices and said auxiliary current control devices to cause biasing thereof as a result of current flow through said principal current control devices, and electrical means associating said distributor means and said auxiliary current control means and said electromagnetic means for causing the setting of said brake means in accordance with the order of supplying controlling currents from said distributor means.

20. The motor control system as described in claim 19, said electrical associating means including a pair of current control means one of which is energized for one direction of rotation of the motor and the other current control means being energized for the opposite direction of rotation of said motor.

References Cited in the file of this patent

UNITED STATES PATENTS

| | | |
|---|---|---|
| 2,671,863 | Matthews | Mar. 9, 1954 |
| 2,782,354 | Thomas | Feb. 19, 1957 |
| 2,837,670 | Thomas et al. | June 3, 1958 |